United States Patent Office 3,632,585
Patented Jan. 4, 1972

3,632,585
ALKALOID SALTS OF 6-PHOSPHOGLUCONIC ACID
Aurelio Filippo Notarianni, Milan, Italy, assignor to SPA-Societa Prodotti Antibiotic S.p.A., Milan, Italy
No Drawing. Filed June 5, 1967, Ser. No. 643,409
Int. Cl. C07d 57/64
U.S. Cl. 260—253
9 Claims

ABSTRACT OF THE DISCLOSURE

Salts and alkaloids of 6-phosphogluconic acid having increased cardiac and uterine activity are provided herein. Specific alkaloids embraced by the present invention included the Rauwolfia alkaloids, xanthine, alkaloids, Leysin bean alkaloids, opium alkaloids, chincona alkaloids and Ephendia alkaloids.

BACKGROUND OF THE INVENTION

It is known that 6-phosphogluconic acid has hitherto only been used in metabolic studies but has not been used for pharmaceutical or therapeutic purposes. It is also known that alkaloids possess valuable biological and pharmacological activities.

SUMMARY OF THE INVENTION

We have now found that the salts of 6-phosphogluconic acid with alkaloids possess an activity which is superior to that of the alkaloids themselves. Thus, the salt formation of alkaloids with 6-phosphogluconic acid potentiates the activity of alkaloids in a surprising and completely unexpected manner.

DETAILED DESCRIPTION OF THE INVENTION

As alkaloids, there can be used all those which are capable of salt formation, as well as alkaloid derivatives. As examples of suitable alkaloids and alkaloid derivatives, there may be mentioned the Rauwolfia alkaloids (e.g. ajmaline, ajmalicine, raunescine, rauwolscine and yohimbane), the xanthine alkaloids (e.g. theophylline and theobromine derivatives), spartein, papaverine, the argot alkaloids and the chincona alkaloids (e.g. quinidine, quinine and quininone).

The new alkaloid salts according to the present invention posses an enhanced biological and pharmacological activity, especially an enhanced cardiac and uterine activity.

As is known, many alkaloids are administered in very small amounts in order to achieve the desired therapeutic effect: if given in large doses, they would have a toxic or fatal effect. On the other hand, since the administration of 6-phosphogluconic acid itself can be of benefit due to it being an intermediate stage in the biosynthesis of nucleotides, which in turn participate in the synthesis of proteins, comparatively large amounts of 6-phosphogluconic acid should be administered, if possible.

Therefore, according to a further feature of the present invention, there are also provided mixed salts of 6-phosphogluconic acid, i.e. salts which are obtained by the partial neutralisation of the acid by a therapeutically-active alkaloid, the acid then being completely neutralised, if desired, with a pharmaceutically-inactive, non-toxic organic or inorganic base. The use of such mixed salts has the added advantage that it permits a more accurate measurement of the dosage of alkaloids, especially in the case of those in which the therapeutic dose is small.

The new salts according to the invention can conveniently be prepared by suspending the barium salt of 6-phosphogluconic acid in an aqueous medium, contacting the suspension with a cationic exchange resin, such as "Amberlite IRC-120," in order to remove the barium ions, filtering off the resin to give an aqueous solution of 6-phosphogluconic acid which is then reacted with an alkaloid to give the desired salt.

Most of the new salts according to the invention have a good water solubility so that, in order to isolate them, it is necessary either to evaporate the solution obtained or to add to the solution a water-miscible organic solvent in which the salts are insoluble, in order to bring about precipitation of the salts. Suitable solvents for this purpose include the lower ketones and the glycol ethers and ether esters.

The following example is given for the purpose of illustrating the present invention:

Example 1

Di(ajmaline) 6-phosphogluconate.—An aqueous slurry of barium 6-phosphogluconate is prepared and then stirred with "Amberlite IRC-120" in order to remove the barium ions. After filtering off the exchange resin, the aqueous solution of 6-phosphogluconic acid so obtained is mixed with two thirds of the equivalent amount of ajmaline in the form of a methanolic solution. There is thus formed di(ajmaline) 6-phosphogluconate which can be obtained in the form of a white powder by evaporating the solution under reduced pressure. This salt is soluble in water, methanol and ethanol but insoluble in other common organic solvents.

Analysis.—$C_6H_{13}O_{10}P \cdot 2[C_{20}H_{26}N_2O_2]$ (M.W. 928.9). Calc. (percent): P, 3.34; N, 6.03. Found (percent): P, 3.47; N, 6.11.

The following compounds were prepared in an anologous manner:

Di - (diethylaminoethyl - theophylline) 6 - phosphogluconate.—This is a white powder which is soluble in water, methanol and ethanol but insoluble in other common organic solvents.

Analysis. — $C_6H_{13}O_{10}P \cdot 2[(C_1H_5)_2N \cdot C_2H_4 \cdot C_7H_7N_4O_2]$ (M.W. 834.8). Calc. (percent): P, 3.71; N, 16.76. Found (percent): P, 3.79; N, 16.43.

Di - (diethylaminoethyl-theobromine) 6-phosphogluconate.—This is a microcrystalline white powder which is soluble in water, methanol and ethanol but is insoluble in other common organic solvents.

Analysis. — $C_6H_{13}O_{10}P \cdot 2[(C_2H_5)_2N \cdot C_2H_4 \cdot C_7H_7N_4O_2]$ (M.W. 834.8). Calc. (percent): P, 3.71; N, 16.76. Found (percent): P, 3.80; N, 16.22.

Mono-(sparteine) 6-phosphogluconate.—This is a crystalline white powder which is soluble in water, methanol and ethanol but insoluble in other common organic solvents.

Analysis.—$C_6H_{13}O_{10}P \cdot C_{15}H_{26}N_2$ (M.W. 510.5). Calc. (percent): P, 6.07; N, 5.49. Found (percent): P, 6.27; N, 5.62.

Mono-(papaverine) 6-phosphogluconate.—This is a crystalline white powder which is soluble in water, methanol and ethanol but insoluble in other common organic solvents.

Analysis.—$C_6H_{13}O_{10}P \cdot C_{20}H_{21}NO_4$ (M.W. 615.53). Calc. (percent): P, 5.04; N, 2.28. Found (percent): P, 4.93; N, 2.23.

Mono-(quinine) 6-phosphogluconate.—This is a white powder which is soluble in water and methanol, slightly soluble in ethanol but insoluble in other common organic solvents.

Analysis.—$C_6H_{13}O_{10}P \cdot C_{20}H_{24}N_2O_2$ (M.W. 600:5). Calc. (percent): P, 5.16; N. 4.66. Found (percent): P, 5.34; N, 4.80.

Mono-(quinidine) 6-phosphogluconate.—This is a white powder which is soluble in water and methanol, slightly soluble in ethanol but insoluble in other common organic solvents.

*Analysis.*—$C_6H_{13}O_{10}P \cdot C_{20}H_{24}N_2O_2$ (M.W. 600.5). Calc. (percent): P, 5.16; N, 4.66. Found (percent): P, 5.34; N, 4.59.

Di-(ephedrine) 6-phosphogluconate.—This is a white powder which is soluble in water, methanol and ethanol but insoluble in other common organic solvents.

*Analysis.*—$C_6H_{13}O_{10}P \cdot 2[C_{10}H_{15}NO]$ (M.W. 606.6). Calc. (percent: P, 5.11; N, 4.62. Found (percent): P, 5.29; N, 4.53.

The present invention also includes within its scope pharmaceutical compositions containing one or more of the new compounds. These pharmaceutical compositions can be administered orally or parenterally in admixture with a solid or liquid pharmaceutical carrier.

Solid compositions for oral administration include compressed tablets, pills, dispersible powders, dragees and granules. In such solid compositions, at least one active compound according to the invention is admixed with at least one inert diluent, such as calcium carbonate, starch, alginic acid or lactose. The compositions may also comprise, as is common practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents and sweetening and flavouring agents.

The compositions according to the invention for oral administration include capsules of absorbable material, such as gelatine, containing at least one of the active substances according to the present invention, with or without the addition of diluents or excipients.

Preparations according to the invention for parenteral administration include sterile aqueous or non-aqueous solutions, suspensions or emulsions. Examples of non-aqueous solvents or suspensing media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporating into the compositions of sterilising agents, by irradiation or by heating. They may also be produced in the form of sterile solid compositions which can be dissolved in sterile water or some other sterile injectable medium immediately before use.

The percentage of active ingredient in the compositions of the present invention may be varied, it being necessary that it should constitute a proportion such that a suitable dosage for the desired therapeutic effect shall be obtained. In general, the preparations of the present invention should be administered, in the case of oral administration, to give 25–750 mg. of active substance per day and, in the case of parenteral administration, 25–500 mg. of active substances per day.

The following examples illustrate pharmaceutical compositions according to the present invention:

Example 2

250 mg. tablets are prepared containing:

|  | Mg. |
|---|---|
| Mono-(sparteine) 6-phosphogluconate | 25 |
| Starch | 70 |
| Magnesium stearate | 5 |

Example 3

250 mg. tablets are prepared containing:

| Mono-(papaverine) 6-phosphogluconate | 100 |
|---|---|
| Starch | 100 |
| Lactose | 45 |
| Magnesium stearate | 5 |

I claim:
1. A salt of an alkaloid with 6-phosphogluconic acid, said alkaloid being selected from the group consisting of Rauwolfia alkaloids, xanthine alkaloids, chincona alkaloids, ergot alkaloids, ephedrine, spartein and papaverine.
2. A salt according to claim 1 which is di-(ajmaline) 6-phosphogluconate.
3. A salt according to claim 1 which is di-(di-ethylaminoethyl-theophylline) 6-phosphogluconate.
4. A salt according to claim 1 which is di-di-ethylaminoethyl-theobromine) 6-phosphogluconate.
5. A salt according to claim 1 which is mono-(sparteine) 6-phosphogluconate.
6. A salt according to claim 1 which is mono-(papaverine) 6-phosphogluconate.
7. A salt according to claim 1 which is mono-(quinine) 6-phosphogluconate.
8. A salt according to claim 1 which is mono-(quinidine) 6-phosphogluconate.
9. A salt according to claim 1 which is di-(ephedrine) 6-phosphogluconate.

References Cited

Henry: "The Plant Alkaloids," The Blakiston Co., Philadelphia, Pa., p. 762 (1949).

The Merck Index, Merck & Co., Inc., Rahway, N.J., 8th ed., pp. 27, 411, 412, 973, 974 (1968).

HENRY R. JILES, Primary Examiner

G. T. TODD, Assistant Examiner

U.S. Cl. X.R.

260—284, 285.5, 286 R, 294 S, 294.3 E, 294.3 A, 294.7 A, 501.19; 424—200, 211

UNITED STATES PATENT OFFICE
CERTIFICATE OF CORRECTION

Patent No. 3,632,585                  Dated January 4, 1972

Inventor(s) Aurelio Filippo NOTARIANNI and Giuseppe GHIELMETTI

It is certified that error appears in the above-identified patent and that said Letters Patent are hereby corrected as shown below:

Column 1, first line after the title, after "Italy," insert -- and Giuseppi Ghielmetti, Milan, Italy, -- and change "assignor" to -- assignors --.

Signed and sealed this 11th day of July 1972.

(SEAL)
Attest:

EDWARD M. FLETCHER, JR.          ROBERT GOTTSCHALK
Attesting Officer                Commissioner of Patents